Jan. 31, 1950     C. M. CASPERSON     2,496,084
WEATHER STRIP
Filed Dec. 5, 1945
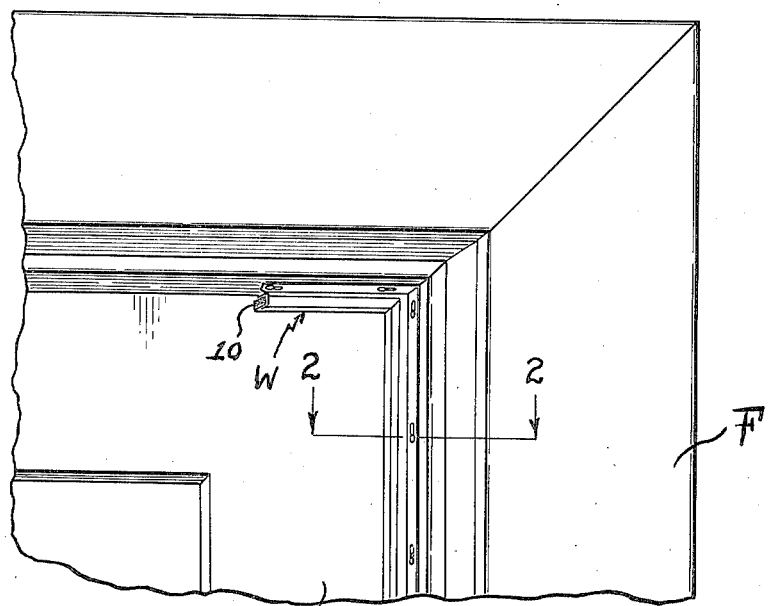
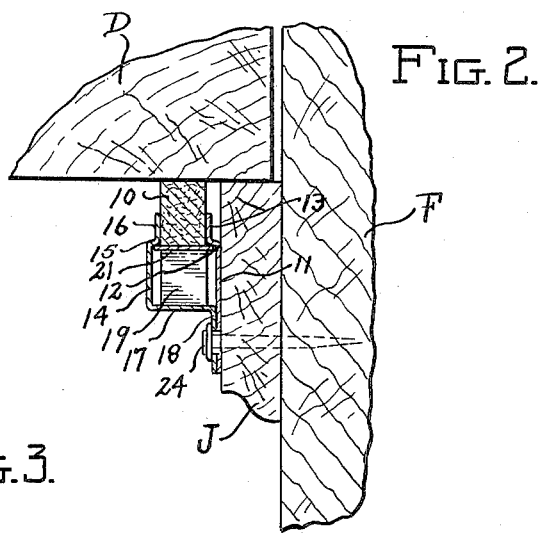
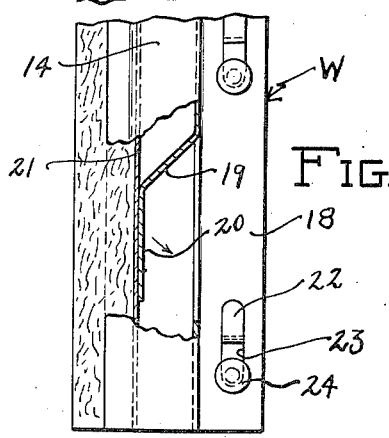
INVENTOR
Charles M. Casperson
BY Malcolm W. Fraser
ATTORNEY Patented Jan. 31, 1950

2,496,084

UNITED STATES PATENT OFFICE 2,496,084

WEATHER STRIP

Charles M. Casperson, Erie, Mich.

Application December 5, 1945, Serial No. 632,970

1 Claim. (Cl. 20—68)

This invention relates to weather strips, and an object is to produce a new and improved weather strip which is simple and reliable in construction and operation, has a minimum number of parts, is provided with novel spring means for resiliently holding the strip in place even though the surface is uneven, is so designed that it can be economically manufactured on a quantity basis, and has the features of construction, and assembly hereinafter described.

For purposes of illustration but not of limitation, an embodiment of the invention is shown on the accompanying drawings in which Figure 1 is a fragmentary elevation of a door frame and door, the latter being shown in closed position and showing the weather strip in position of use;

Figure 2 is an enlarged fragmentary sectional view on the line 2—2 of Figure 1; and Figure 3 is an enlarged elevation of the weather strip, a part being broken away and showing the spring tongues and associated parts in section.

The illustrated embodiment of the invention comprises a door frame F and door D, and jamb strip J on the frame F and against which the door D abuts. The weather strip is generally indicated at W and as shown, is secured to the jamb J in such position that the elongate contact piece 10 of felt or other similar material engages the door when the latter is in closed position particularly as indicated on Figure 2.

The weather strip W comprises a channel preferably made from spring sheet metal and has an elongate strip 11 which abuts against the jamb J and adjacent the outer end portion the strip 11 is formed with an inwardly extending shoulder 12 which terminates in a guide portion 13 spaced inwardly from and in substantially parallel relation to the body of the strip 11. Cooperating with the strip 11 to form the channel W is another strip having a body portion 14 which is spaced laterally from and parallel to the body portion of the strip 11 and integrally formed on the body portion 14 is an inwardly extending shoulder 15 diametrically opposed to the shoulder 12 and extending outwardly from the shoulder 15 in laterally spaced parallel relation to the portion 13 is a guide portion 16. Between the guide portions 13 and 16 is disposed the felt weather strip or contact piece 10, these portions guiding the sliding movement of the weather strip as will hereinafter appear. Integral with the body portion 14 and extending inwardly therefrom at substantially right angles is a wall portion 17 which extends to the strip 11 and terminates in a right angle downwardly extending flange 18 which abuts against an integral extension of the strip 11.

Struck from the wall 17 is a series of integral spring tongues 19 which, as shown in Figure 3, incline outwardly from the wall 17 and terminate in engaging portions 20 of substantial length. These spring engaging portions 20 engage the under side of an elongate plate 21 which may be of sheet metal and is of a width slightly less than the transverse dimension of the channel W so as to have free movement therein limited outwardly by engagement with the shoulders 12 and 15 which serve as stops.

In this instance, the felt strip or contact piece 10 is adhesively secured to the upper face of the plate 21. It will thus appear that the spring tongues 19 constantly urge the strip 10 outwardly of the channel and into engagement with the door D or whatever other surface which is desired to be sealed. The arrangement is such that in the event of irregularities in the surface of contour of the door D or other surface to be engaged by the strip 10, the springs 19 which resiliently force the strip outwardly are adapted to enable it to conform to such irregularities so that efficient and satisfactory sealing contact is achieved.

In this instance, the flange 18 and strip 11 are secured together by tongues 22 which are struck from these parts when in abutting relation and then bent over upon themselves substantially as indicated in Figure 3, thus to clinch and effectively secure these parts together. In so doing, registering apertures 23 are formed in the flange 18 and strip 11 and these apertures are utilized to receive tacks, nails or screws 24 for securing the weather strip assembly to the jamb J or other supporting surface.

It will be manifest that I have produced an exceedingly simple and inexpensive weather strip unit which lends itself admirably to quantity production and can be produced from relatively inexpensive dies. One desirable feature is that the weather strip can effect a seal against a surface even though the latter is irregular or rough due to the inherent action of the spring tongues. The formation of the tongues as an integral part of the unit militates against the trouble and expense heretofore occasioned in the assembly of these devices as well as insuring that the proper and desired resilient or spring effect will be achieved with respect to the contact piece at all times. It should also be pointed out that the unique manner in which the parts of the channel are secured together without the use of welding, riveting or similar means is of importance in keeping the cost of the unit as low as possible and also providing apertures for the reception of nails, screws or other fastening devices.

It is to be understood that numerous changes in details of construction, arrangement and operation may be effected without departing from the spirit of the invention especially as defined in the appended claim.

What I claim is:

A weather strip comprising an elongate spring metal strip, an inwardly extending shoulder on said strip adjacent an edge portion thereof, said edge portion constituting one side of a guide, a second elongate metal strip in spaced parallel relation to said first strip, an inwardly extending shoulder on said second strip opposite said first shoulder, the adjacent edge portion of said second strip constituting the other side of said guide, a felt-like weather strip slidable in said guide with a substantial portion projecting outwardly therefrom, a wall portion integral with said second strip and projecting at right angles therefrom to said first strip, a terminal flange on said wall portion abutting said first strip, means connecting said flange and said first strip, a plurality of resilient tongues struck from said first strip and terminating in elongate substantially flat portions, an elongate pressure plate against one side of which said flat tongue portions bear, said shoulders limiting the outward movement of said pressure plate, and an adhesive connection between said felt-like weather strip and the opposite side of said pressure plate.

CHARLES M. CASPERSON.

REFERENCES CITED

The following references are of record in the file of this patent:

UNITED STATES PATENTS

| Number | Name | Date |
| --- | --- | --- |
| 1,115,319 | Leech | Oct. 27, 1914 |
| 1,190,759 | Harrington | July 11, 1916 |
| 1,879,026 | Basham | Sept. 27, 1932 |
| 2,043,706 | Myers | June 9, 1936 |
| 2,315,979 | Norden | Apr. 6, 1943 |